US008918728B2

(12) United States Patent
Hamilton, II et al.

(10) Patent No.: US 8,918,728 B2
(45) Date of Patent: Dec. 23, 2014

(54) RULE-BASED CONTENT FILTERING IN A VIRTUAL UNIVERSE

(75) Inventors: Rick A. Hamilton, II, Richmond, VA (US); Paul A. Moskowitz, Hawthorne, NY (US); Brian M. O'Connell, Research Triangle Park, NY (US); Clifford A. Pickover, Yorktown Heights, NY (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1100 days.

(21) Appl. No.: 12/492,207

(22) Filed: Jun. 26, 2009

(65) Prior Publication Data

US 2010/0332997 A1 Dec. 30, 2010

(51) Int. Cl.
*G06F 3/0481* (2013.01)
*G06F 21/62* (2013.01)
*H04L 29/06* (2006.01)

(52) U.S. Cl.
CPC .......... *G06F 21/6218* (2013.01); *H04L 63/102* (2013.01); *H04L 67/38* (2013.01)
USPC .......... 715/757; 715/753; 715/740; 715/741; 715/706

(58) Field of Classification Search
CPC .................................................. G06F 3/04815
USPC ....................................................... 715/757
See application file for complete search history.

(56) References Cited

U.S. PATENT DOCUMENTS

| | | | |
|---|---|---|---|
| 7,073,129 B1 * | 7/2006 | Robarts et al. | 715/740 |
| 7,373,377 B2 | 5/2008 | Altieri | |
| 7,836,151 B2 * | 11/2010 | Bellotti et al. | 709/218 |
| 7,953,079 B2 * | 5/2011 | John et al. | 370/389 |
| 8,069,169 B2 * | 11/2011 | Fitzpatrick et al. | 707/732 |
| 2002/0097267 A1 * | 7/2002 | Dinan et al. | 345/757 |
| 2003/0005439 A1 * | 1/2003 | Rovira | 725/37 |
| 2003/0009495 A1 * | 1/2003 | Adjaoute | 707/501.1 |
| 2005/0120369 A1 * | 6/2005 | Matz | 725/40 |
| 2005/0154769 A1 * | 7/2005 | Eckart et al. | 707/201 |
| 2007/0024613 A1 * | 2/2007 | Jung et al. | 345/419 |
| 2007/0214030 A1 * | 9/2007 | Shear et al. | 705/8 |
| 2007/0260603 A1 * | 11/2007 | Tuscano et al. | 707/9 |
| 2007/0268299 A1 * | 11/2007 | Jung et al. | 345/581 |
| 2007/0271220 A1 * | 11/2007 | Carter | 707/2 |
| 2008/0049767 A1 * | 2/2008 | Koltenuk | 370/401 |
| 2008/0086646 A1 * | 4/2008 | Pizano | 713/189 |

(Continued)

OTHER PUBLICATIONS

Marvie, J-E et al., "A VrmL97-X3D Extension for Massive Scenery Management in Virtual Worlds," IEEE/ACM Digital Library 2004, pp. 145-153, 188.

(Continued)

*Primary Examiner* — William Bashore
*Assistant Examiner* — Reza Nabi
(74) *Attorney, Agent, or Firm* — William E. Schiesser; Keohane & D'Alessandro PLLC

(57) ABSTRACT

A system that enables individuals or companies to allow an avatar's transits and communications within a virtual universe. The system enables the selection of regions and/or content. Additionally, companies can use this system to prevent accidental communication of proprietary material. Also provided are a method and a computer readable medium containing a program product including the method to enable individuals or companies to allow an avatar's transits and communications within a virtual universe.

20 Claims, 7 Drawing Sheets

(56) References Cited

U.S. PATENT DOCUMENTS

| | | | |
|---|---|---|---|
| 2008/0098064 A1 | 4/2008 | Sherinian | |
| 2008/0148056 A1* | 6/2008 | Ginter et al. | 713/176 |
| 2008/0168548 A1* | 7/2008 | O'Brien | 726/9 |
| 2008/0208749 A1* | 8/2008 | Wallace et al. | 705/44 |
| 2009/0013263 A1* | 1/2009 | Fortnow et al. | 715/753 |
| 2009/0043652 A1* | 2/2009 | Ginter et al. | 705/14 |
| 2009/0048978 A1* | 2/2009 | Ginter et al. | 705/51 |
| 2009/0058862 A1* | 3/2009 | Finn et al. | 345/473 |
| 2009/0069084 A1* | 3/2009 | Reece et al. | 463/32 |
| 2009/0113519 A1* | 4/2009 | Evans et al. | 726/1 |
| 2009/0115776 A1* | 5/2009 | Bimbra et al. | 345/419 |
| 2009/0132718 A1* | 5/2009 | Groll et al. | 709/229 |
| 2009/0133051 A1* | 5/2009 | Hildreth | 725/28 |
| 2009/0254656 A1* | 10/2009 | Vignisson et al. | 709/224 |
| 2009/0312080 A1* | 12/2009 | Hamilton et al. | 463/1 |
| 2009/0327889 A1* | 12/2009 | Jeong et al. | 715/706 |
| 2010/0058486 A1* | 3/2010 | Wilson et al. | 726/28 |
| 2010/0083112 A1* | 4/2010 | Dawson et al. | 715/706 |
| 2010/0100452 A1* | 4/2010 | Smith et al. | 705/26 |
| 2010/0114857 A1* | 5/2010 | Edwards et al. | 707/709 |
| 2010/0169125 A1* | 7/2010 | Dawson et al. | 705/4 |
| 2010/0241507 A1* | 9/2010 | Quinn et al. | 705/14.42 |
| 2010/0332997 A1* | 12/2010 | Hamilton et al. | 715/757 |
| 2011/0029885 A1* | 2/2011 | Camenisch et al. | 715/741 |
| 2011/0061109 A1* | 3/2011 | Austin et al. | 726/27 |
| 2011/0113018 A1* | 5/2011 | Hamilton et al. | 707/692 |
| 2011/0167132 A1* | 7/2011 | Kazerouni et al. | 709/217 |
| 2011/0283311 A1* | 11/2011 | Luong | 725/28 |

OTHER PUBLICATIONS

Hadjiefthymiades, S. et al., "Using Proxy Cache Relocation to Accelerate Web Browsing in Wireless/Mobile Communications," ACM Digital Library, WWW10, May 1-5, 2001, Hong Kong, pp. 26-34.

He, Z. et al., "Path and cache conscious prefetching (PCCP)," ACM Digital Library, the VLDB Journal (2007), pp. 236-249.

* cited by examiner

RULE-BASED CONTENT FILTERING IN A VIRTUAL UNIVERSE

FIELD OF THE INVENTION

This invention relates generally to virtual universes (VUs) and more specifically to rule-based content filtering in the VU.

BACKGROUND OF THE INVENTION

Virtual universes (VUs) or virtual worlds are computer-based simulated environments intended for its users or residents to inhabit and interact via avatars, which are personas or representations of the users of the virtual universes. VUs are also known as metaverses or "3D Internet". These types of virtual universes are now most common in multiplayer online games, such as Second Life®, which is a trademark of Linden Research Inc. Avatars in these types of virtual universes, which can number well over a million, have a wide range of business and social experiences.

Presently, methods do not exist to prevent exposure to sensitive content, such as confidential material, within virtual universes. Furthermore, companies may wish to manage access to their regions which may be visited by avatars to prevent accidental transfer of proprietary, confidential or contaminating information. No existing solution provides this functionality.

SUMMARY OF THE INVENTION

The present invention provides a system that enables individuals or companies to manage an avatar's transits and communications within regions of a virtual universe. The system enables the selection of regions and/or content that is acceptable for those carrying out the functions of their employ. Additionally, companies can likewise use these methods to prevent accidental or intentional communication of proprietary information between an employee and a non-authorized person. Furthermore, individuals may use this system to allow self-imposed limitations on virtual universe transit and communication.

A first aspect of the present invention provides a method for filtering content in a virtual universe (VU), comprising: receiving a request for content exposure restrictions for an avatar in the VU; generating a set of rules that reflect the content exposure restrictions; tagging the avatar with at least one tag; comparing an action attempted by the avatar to the set of rules; and determining whether the action will be allowed based on the set of rules and the at least one tag.

A second aspect of the present invention provides a computer apparatus system for filtering content in a virtual universe (VU), comprising: a request processing module for receiving a request for content exposure restrictions for an avatar in the VU; a rules processing module for generating a set of rules that reflect the content exposure restrictions; a tagging processing module for tagging the avatar with at least one tag; a comparison processing module for comparing an action attempted by the avatar to the set of rules; and a decision processing module for determining whether the action will be allowed based on the set of rules and the at least one tag.

A third aspect of the present invention provides a computer readable medium containing a program product for filtering content in a virtual universe (VU), the computer readable medium comprising program code for causing a computer apparatus to: receive a request for content exposure restrictions for an avatar in the VU; generate a set of rules that reflect the content exposure restrictions; tag the avatar with at least one tag; compare an action attempted by the avatar to the set of rules; and determine whether the action will be allowed based on the set of rules and the at least one tag.

A fourth aspect of the present invention provides a method for deploying a system for filtering content in a virtual universe (VU), comprising: providing a computer apparatus infrastructure to: receive a request for content exposure restrictions for an avatar in the VU; generate a set of rules that reflect the content exposure restrictions; tag the avatar with at least one tag; compare an action attempted by the avatar to the set of rules; and determine whether the action will be allowed based on the set of rules and the at least one tag.

A fifth aspect of the present invention provides a data processing system for filtering content in a virtual universe (VU), comprising: a memory-containing medium containing instructions; a bus coupled to the memory; and a processor coupled to the bus that when executing the instructions causes the data processing system to: receive a request for content exposure restrictions for an avatar in the VU; generate a set of rules that reflect the content exposure restrictions; tag the avatar with at least one tag; compare an action attempted by the avatar to the set of rules; and determine whether the action will be allowed based on the set of rules and the at least one tag.

BRIEF DESCRIPTION OF THE DRAWINGS

These and other features of this invention will be more readily understood from the following detailed description of the various aspects of the invention taken in conjunction with the accompanying drawings in which.

Figure 1:
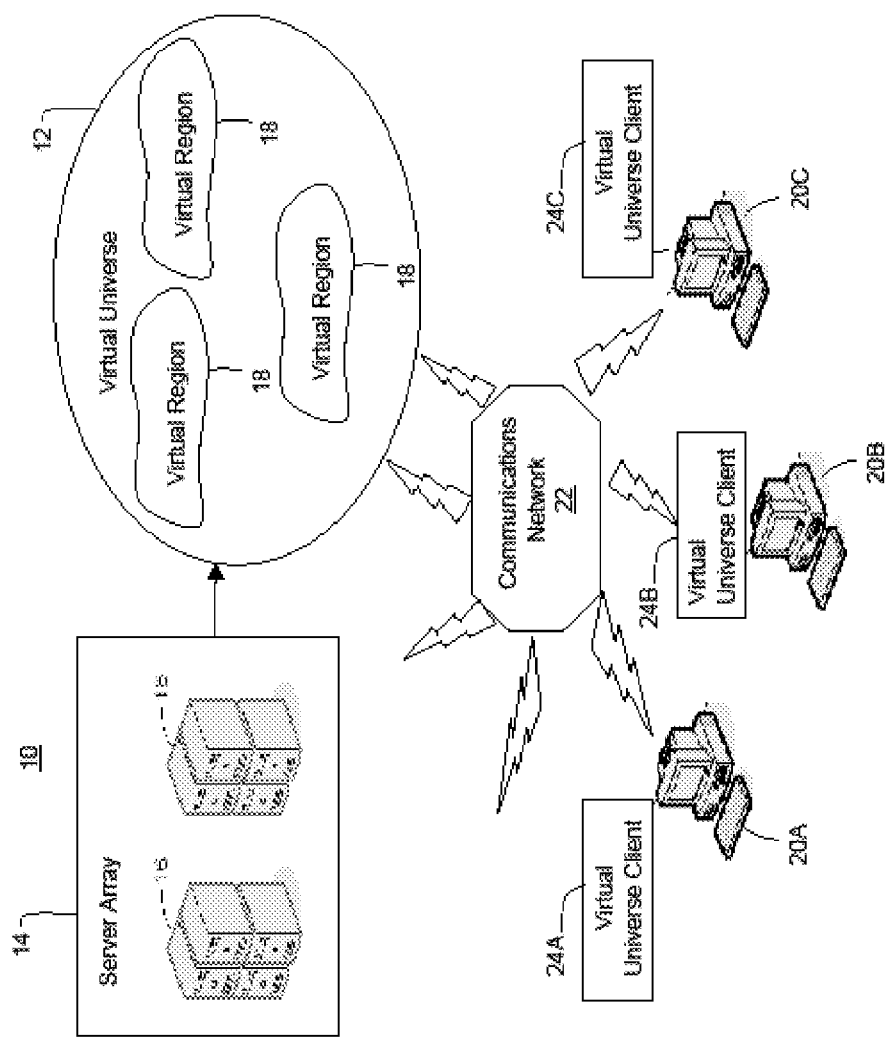
FIG. 1 shows a high-level schematic diagram showing a networking environment for providing a virtual universe according to one embodiment of this invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

For convenience, the Detailed Description of the Invention has the following sections:
 I. VU concepts Defined
 II. General Description
   A. Core Description
   B. Examples
   C. Additional Features
 III. Computerized Implementation
I. VU Concepts Defined (1) An avatar is a graphical representation the user selects that others can see, often taking the form of a cartoon-like human.

(2) An agent is the user's account, upon which the user can build an avatar, and which is tied to the inventory of assets the user owns.

(3) A region is a virtual area of land within the VU, typically residing on a single server.

(4) Assets, avatars, the environment, and anything visual includes of UUIDs tied to geometric data (distributed to users as textual coordinates), textures (distributed to users as graphics files such as JPEG2000 files), and effects data (rendered by the user's client according to the user's preferences and user's device capabilities).

(5) Objects in a virtual universe are composed of one or more primitive objects such as cones, triangles and polygons. The more detailed an object is (i.e., the more primitive objects it is composed of) the longer the object will take to render and download. It is common for virtual world regions to incorporate many objects in their design.

(6) Cache—A cache is a collection of data duplicating original values stored elsewhere or computed earlier, where the original data is expensive to fetch (due to slow access time) or to compute, relative to the cost of reading the cache. A cache is a temporary storage area where frequently accessed data can be stored for rapid access. Once the data is stored in the cache, future use may access the cached copy rather than re-fetching or re-computing the original data, resulting in a lower average access time.

(7) Rendering—Rendering is the process of producing the pixels of an image from a higher-level description of its components. Additionally, rendering is the process of generating an image from a model by means of computer programs. The model is a description of three dimensional objects in a strictly defined language or data structure. Models contain geometry, viewpoint, and texture (8) Items refer to anything capable of being downloaded, displayed, and/or used in a virtual universe. Examples include, among other things, objects, textures, advertisements, scripts, etc.

II. General Description

A. Core Description

The present invention provides a system that enables individuals or companies, etc. to manage an avatar's transits and communications within a virtual universe. The system enables the selection of regions and/or content is acceptable for those in their employ. Additionally, companies can likewise use these methods to prevent accidental or intentional communication between an employee and a non-authorized person. Furthermore, individuals may use this system to impose limitations on virtual universe transit and communication.

FIG. 1 shows a high-level schematic diagram showing a networking environment 10 for providing a virtual universe 12 according to one embodiment of this invention in which content can be provided. As shown in FIG. 1, networking environment 10 comprises a server array or grid 14 comprising a plurality of servers 16 each responsible for managing a portion of virtual real estate within virtual universe 12. A virtual universe provided by a multiplayer online game, for example, can employ thousands of servers to manage all of the virtual real estate. The virtual content of the virtual real estate that is managed by each of servers 16 within server array 14 shows up in virtual universe 12 as a virtual region 18 made up of objects, textures, and scripts.

Like the real world, each virtual region 18 within virtual universe 12 comprises a landscape having virtual content, such as buildings, stores, clubs, sporting arenas, parks, beaches, cities and towns all created by administrators or residents of the universe that are represented by avatars. These examples of virtual content are only illustrative of some things that may be found in a virtual region and are not limiting. Furthermore, the number of virtual regions 18 shown in FIG. 1 is only for illustrative purposes and those skilled in the art will recognize that there may be many more regions found in a typical virtual universe, or even only one region in a small virtual universe.

FIG. 1 also shows that users operating computers 20A-20C (hereinafter referred generally as 20) interact with virtual universe 12 through a communication network 22 via virtual universe clients 24A-24C (hereinafter referred generally as 24) that reside in computers 20, respectively. Below are further details of virtual universe 12, server array 14, and virtual universe client 24.

One of the ways that users of virtual universe 12 can use virtual universe client 24 to interact with the universe is to view advertising content within the virtual universe. An illustrative but non-limiting listing of advertisements that can be viewed through virtual universe client 24 includes items such as billboards, store window display, etc. As will be further described herein, embodiments of this invention are directed to facilitating the management of these advertisement assets in virtual universe 12.

Figure 2:
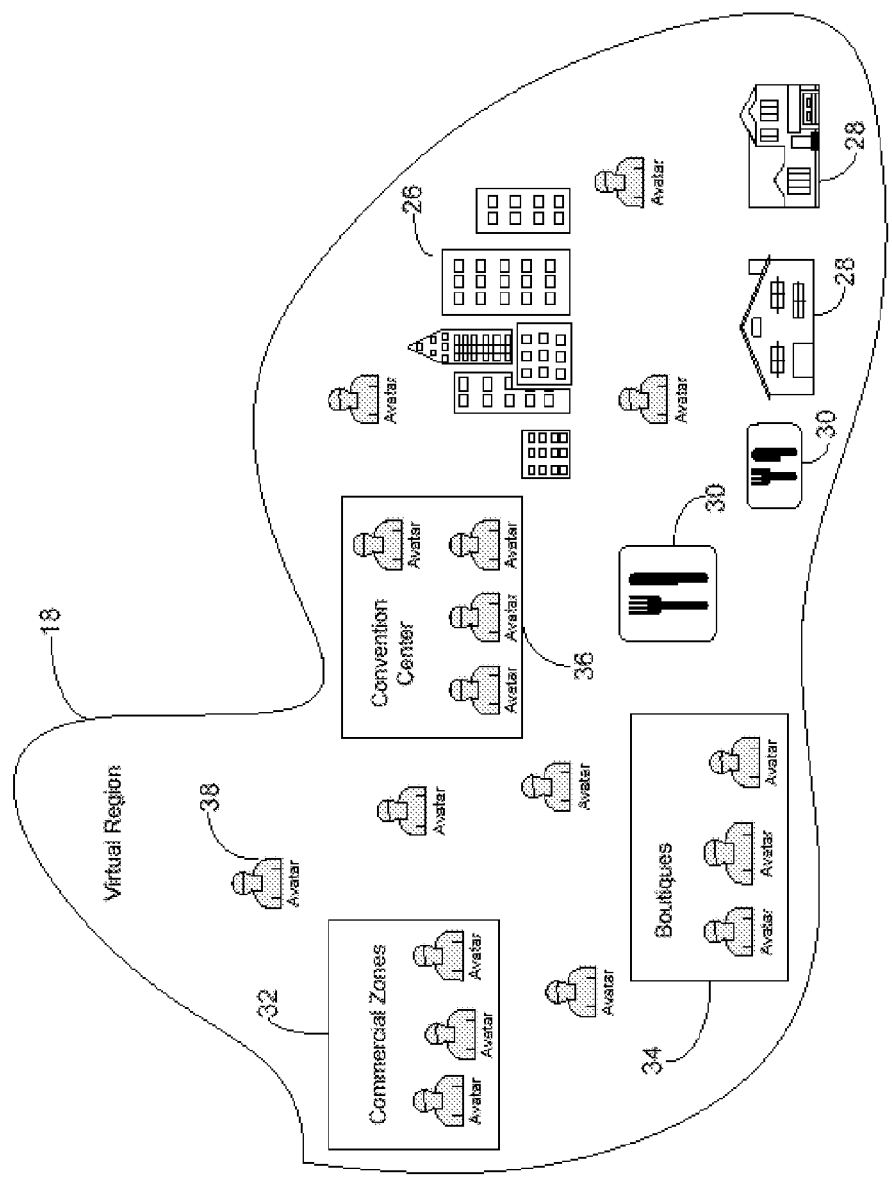
FIG. 2 shows a more detailed view of a virtual region shown in the virtual universe of FIG. 1.

FIG. 2 shows a more detailed view of what one virtual region 18 in virtual universe 12 may comprise. As an example, virtual region 18 shown in FIG. 2 comprises a downtown office center 26, homes 28, restaurants 30, a supermarket 32 and a shopping mall 34 for shopping, and a convention center 36 for meetings and various conventions. Residents or avatars 38, which as mentioned above, are personas or representations of the users of the virtual universe, which that who roam all about the virtual region by walking, driving, flying, or even by teleportation or transportation, which is essentially moving through space from one point to another, more or less instantaneously. These examples of virtual content in virtual region 18 shown in FIG. 2 are only illustrative of some items that may be found in a virtual region and those skilled in the art will recognize that these regions can have many more items that can be found in the real world universe as well as things that do not presently exist in the real world.

Figure 3:
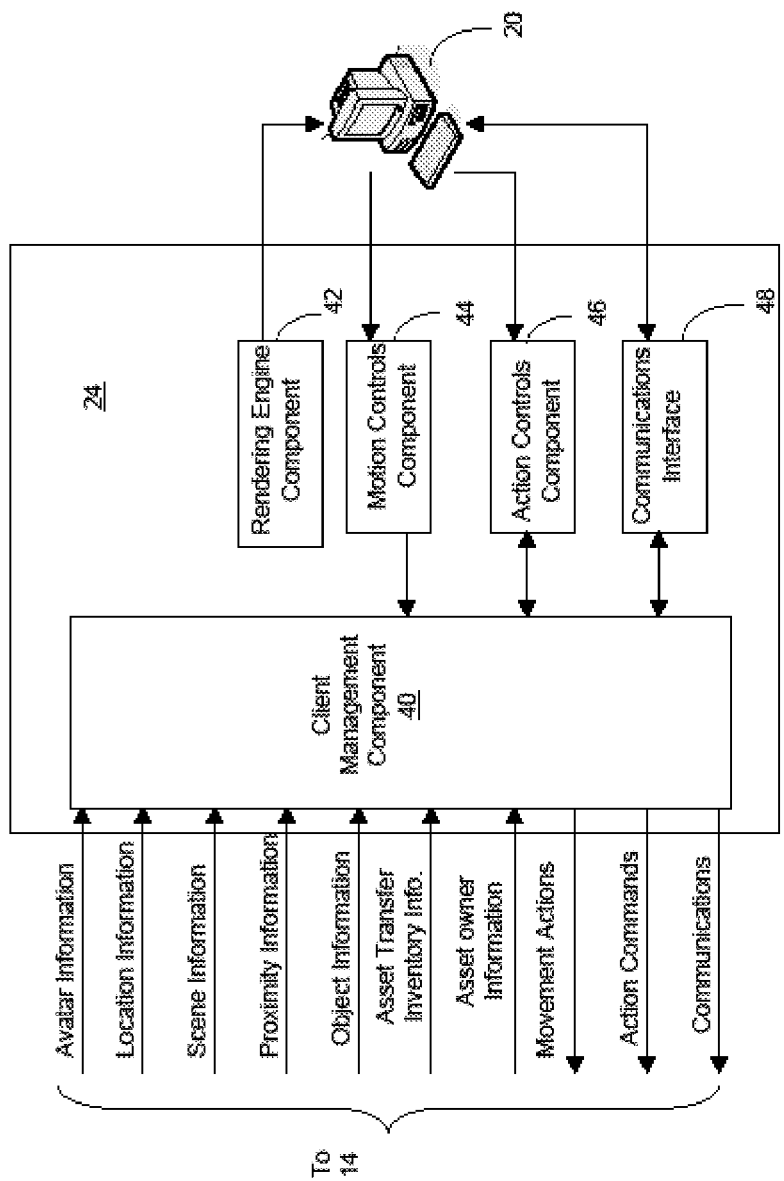
FIG. 3 shows a more detailed view of the virtual universe client shown in FIG. 1.

FIG. 3 shows a more detailed view of virtual universe client 24 shown in FIG. 1. Virtual universe client 24, which enables users to interact with virtual universe 12, comprises a client management component 40, which manages actions, commands, and communications made by a user through computer 20, and information received from the virtual universe through server array 14. A rendering engine component 42 enables the user of computer 20 to visualize his or her avatar within the surroundings of the particular region of virtual universe 12 in which the avatar is presently located. A motion controls component 44 enables the user's avatar(s) to make movements through the virtual universe. In one embodiment, movements through the virtual universe can include, for example, gestures, postures, walking, running, driving, flying, etc. An action controls component 46 and enables the user to perform actions in the virtual universe such as buying items for his or her avatar or even for their real-life selves, building homes, planting gardens, etc. These actions are only illustrative of some possible actions that a user can perform in the virtual universe and are not limiting. A communications interface 48 enables a user to communicate with other users of virtual universe 12 through modalities such as chatting, instant messaging, gesturing, talking, and electronic mail (e-mail).

FIG. 3 shows the various types of information received by client management component 40 from the virtual universe through the server array 14. In particular, client management component 40 receives avatar information about the avatars that are in proximity to the user's avatar. In addition, client management component 40 receives location information about the area that the user's avatar is near (e.g., what region or island he or she is in), as well as scene information (e.g., what the avatar sees). Client management component 40 also receives proximity information, which contains information on what the user's avatar is near, and object information, which is information about nearby objects. Client management component 40 receives avatar and location information, which information is utilized by the demographic tracking utility 53. FIG. 3 also shows the movement commands and action commands that are generated by the user and sent to the server array via client management component 40, as well as the communications that can be sent to the users of other avatars within the virtual universe.

Figure 4:
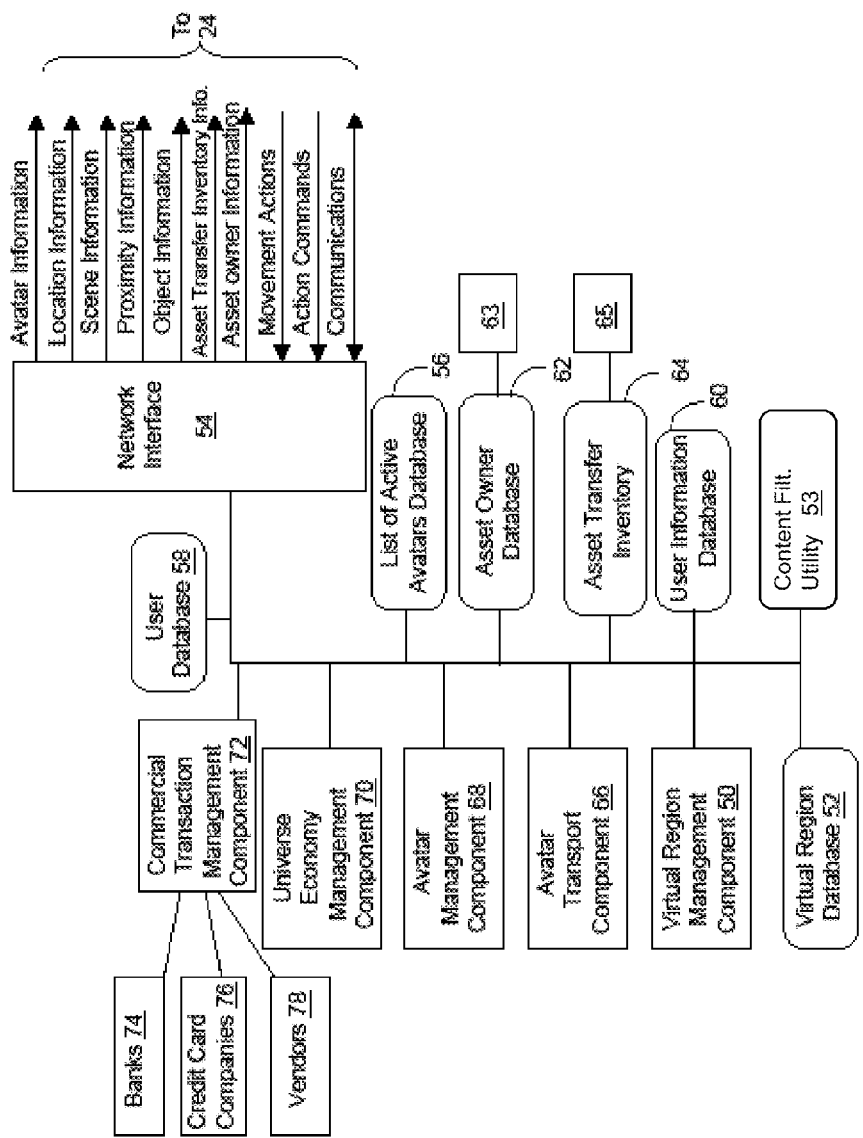
FIG. 4 shows a more detailed view of some of the functionalities provided by the server array shown in FIG. 1.

FIG. 4 shows a more detailed view of some of the functionalities provided by server array 14 shown in FIG. 1. In particular, FIG. 4 shows a virtual region management component 50 that manages a virtual region(s) within the virtual universe. Virtual region management component 50 manages what happens in a particular region, such as the type of landscape in that region, the number of homes, commercial zones, boutiques, streets, parks, restaurants, etc. For example, virtual region management component 50 would allow the owner of a particular region or establishment within the region to specify requirements for entering or remaining within the region that could potentially affect certain avatar characteristics. Those skilled in the art will recognize that virtual region management component 50 can manage many other facets within the virtual region.

FIG. 4 shows a network interface 54 that enables server array 14 to interact with virtual universe client 24 residing on computer 20. In particular, network interface 54 communicates active avatar, location, scene, proximity, script, object, asset transfer inventory, asset owner, user database, and user information to the user through virtual universe client 24. The network interface receives movement and action commands, as well as communications from the user via virtual universe client 24.

FIG. 4 also shows a content filtration utility 53, which provides functionality of the present invention such as to pre-fetch/cache items based on communications between avatars, as will be further described below. In this embodiment, content filtration utility 53 resides on the same computer system as server array 14, and communicates directly to virtual universe 12 and its users via virtual universe client 24. In other embodiments, content filtration 53 might reside on the same computer as virtual universe client 24, have components that reside on both server array 14 and virtual universe client 24, or reside on separate computers in direct communication with virtual universe servers 16 and virtual universe clients 24.

As shown in FIG. 4, there are several different databases or modules for storing information. In particular, virtual region database 52 stores information on all of the specifics in virtual region 18 that virtual region management component 50 is managing. Virtual region database 52 contains metadata information about the objects, texts, and scripts associated with the virtual content in the virtual region(s). Active avatars database 56 contains a list of all the avatars that are online in the virtual universe 12, while databases 58 and 60 contain information on the actual human users or avatars in the virtual universe 12. In one embodiment, user database 58 contains general information on the users such as names, email addresses, etc., while user information database 60 contains more sensitive information on the users such as billing information (e.g., credit card information) for taking part in transactions.

Databases 52, 56, 58, 60 and 62 contain information on the avatars of the users that reside in virtual universe 12. In one embodiment, virtual region database 52, list of active avatars database 56, user database 58, user information database 60, and asset owner database 62 are tracked for avatars within a multidimensional space of the virtual region 18. The information is typically in the form of metadata associated with the virtual content of each user's avatar(s). An illustrative but non-limiting list of avatar usage information includes identification information, asset inventory, and purchases. Those skilled in the art will recognize that this listing of avatar usage information is illustrative of possible items and is not exhaustive. For example, other user information may include name of the owner, e-mail address of the owner, etc.

Each item may be associated with a piece of executable code or other data called a script, which may affect rendering in some fashion during a session in the virtual universe. A clothing asset, for example, may be rendered with a script that causes the clothing to shimmer. A virtual pet, in another example, may render as an automated avatar that follows the user's avatar within the virtual universe.

Virtual region database 52, list of active avatars database 56, user database 58, user information database 60, and asset owner database 62 are databases that contain item information within content filtration utility 53. In an exemplary embodiment, asset transfer inventory 64 comprises a listing table 65 having a foreign key to an asset table 63 within asset owner database 62, such that querying the asset transfer inventory 64 pulls information from asset table 63 to listing table 65. Those skilled in the art will recognize that other techniques for transferring data between databases 52, 56, 58, 60 and 63 are possible within the scope of the invention.

Those skilled in the art will also recognize that databases 52-63 may contain additional information if desired. Databases 52-63 may be consolidated into a single database or table, divided into multiple databases or tables, or clustered into a database system spanning multiple physical and logical devices. Further, although the above information is shown in FIG. 4 as being stored in databases, those skilled in the art will recognize that other configurations and means of storing information can be utilized. For example, virtual region database 52, list of active avatars database 56, user database 58, user information database 60, and asset owner database 62 might reside on the same computers as virtual universe client 24, and have components that reside on both server array 14 and virtual universe client 24, or reside on separate computers in direct communication with virtual universe servers 16 and virtual universe client 24.

An avatar transport component 66 enables users, as mentioned above, to transport through space from one point to another point instantaneously. As a result, an avatar could, for example, travel from a business region to an entertainment region to experience a concert.

An avatar management component 68 keeps track of what the avatars are doing while in the virtual universe. For example, avatar management component 68 can track where each avatar is presently located in the virtual universe, as well as what activities it is performing or has recently performed. An illustrative but non-exhaustive list of activities can include shopping, eating, talking, recreating, for example.

Because a typical virtual universe has a vibrant economy, server array 14 has functionalities that are configured to manage the economy. In particular, a universe economy management component 70 manages transactions that occur within the virtual universe between avatars. In one embodiment, virtual universe 12 will have its own VU currency ($VU) that users pay for with real-life money. The users can then take part in commercial transactions for their avatars through universe economy management component 70. For example, an avatar might want to pay for a service that provides discovery and transfer of assets within the virtual universe. In this case, the avatar would make the purchase of this service using the VU. In some instances, the user may want to take part in a commercial transaction that benefits him or her and not an avatar. In this case, a commercial transaction management component 72 allows the user to participate in the transaction. For example, while walking around a commercial zone, a user may see a pair of shoes that he or she would like for themselves and not the user's avatar. In order to fulfill this type of transaction and others similarly related, commercial transaction management component 72 interacts with banks 74, credit card companies 76, and vendors 78.

B. Example—Employee Content Communication Managing

Corporations may exclude employee avatars from regions within a virtual universe or from receiving proprietary content from certain competitors. Employers may tag an employee's avatar with the name of the company and a list of competitors/companies with a sub tag indicating permitted information exchange. For instance an employer company may have agreements for the exchange of confidential information with one or more companies but not with others. Before two avatars engage in an exchange of information, a virtual universe database is consulted to ascertain if information exchange is permitted and what information may be transmitted. Thus, if company A has an agreement with company B allowing the exchange of confidential information, then an employee of B may be allowed to enter into a conversation about that information with an employee of company A or the employee of B may be permitted to attend a seminar hosted by company A in which confidential information is discussed. Furthermore, companies may manage the entrance into a region controlled by the company by only permitting avatars tagged with specific company names into the region.

Additionally, allowing travel to a specific region or the receiving of communications may be based upon the age of the user associated with an avatar or a rating for the region. Certain regions, for example, may be reserved for children and not adults.

Regions may be rated according to a progressive rating system. When a user instructs an avatar in a virtual universe to travel to a region, a virtual universe database is consulted to retrieve the rating for the region and compare the region rating to the rating tag associated with the avatar. If transit to a particular region is not permitted, the avatar may be advised to travel to another region. The progressive rating system may contain levels of access. For example, the levels for communication of proprietary content can be structured to include: level 1 for allowing the communication of proprietary documents to employees of a corporation for which a confidentiality agreement has been signed; level 2 for allowing the communication of specific proprietary documents to selected employees of a corporation for which a confidentiality agreement has been signed; level 3 for restricting the communication of all proprietary documents to all employees of any corporation for which a confidentiality agreement has not been signed. In this example, the lower the level number, the greater the degree of access allowed. For instance, access by level can be used to prevent the communication of inventive content where the communication can limit patentability of the content. Ratings may be assigned to specific documents or to regions containing those documents.

Figure 5:
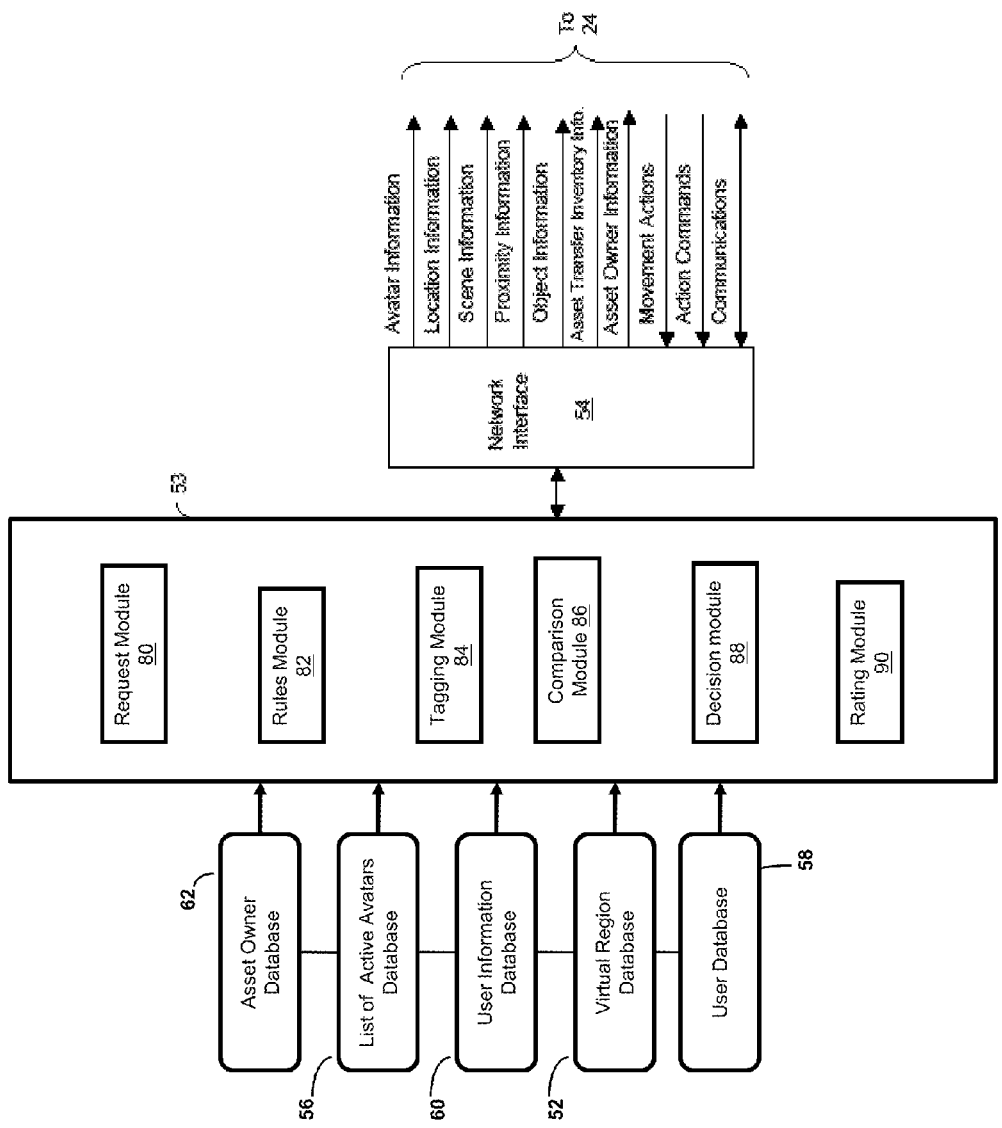
FIG. 5 shows a more detailed diagram of the content filtration utility of FIG. 4.

Referring to FIG. 5, the features and functions of the present invention will be described in greater detail. As depicted, content filtration utility 53 comprises request processing module 80, rules processing module 82, tagging processing module 84, comparison processing module 86, decision processing module 88, and rating processing module 90.

Under the present invention, request processing module 90 will receive a request for content exposure restrictions for an avatar in the VU. Based on the request, rules processing module 82 will generate a set (at least one) of rules that reflect the content exposure restrictions, and tagging processing module 84 will tag the avatar with at with at least one tag. For any action attempted by the avatar, comparison processing module 86 will compare an action attempted by the avatar to the set of rules. Decision processing module 88 will determine whether the action will be allowed based on the set of rules and the tag(s). Rating processing module 90 allows regions in the VU to be assigned a rating. A separate content processing module may be used to set ratings for content in the VU. Also, a rating limit can be assigned or set for the avatar by rating processing module 90. The rating can be used by a region access processing module to prevent access by the avatar to regions having a rating higher than the rating limit, e.g., comparison processing module and/or decision processing module. Similarly, the rating for content can be used by a content access processing module to prevent access to content by an avatar if the rating exceeds a maximum allowable content rating for the avatar. Also, a shield processing module can be used for establishing a virtual shield around content that the avatar is prevented from accessing.

Restrictions may include acceptable regions, initiating communications, information transfer, or content exposure. Tags may be placed on avatars by avatar owners or employers. The following are example tag categories and should are provided for illustrative purposes only, and are not provided to limit the scope of this invention:

An avatar may be also tagged to indicate the age of the avatar operator. The age tag may include the birth date of the operator so the age may be computed dynamically upon each virtual universe interaction. Regions or content within a virtual universe may impose age restrictions for avatars, this tag may be used to ascertain if an avatar meets those age restrictions. Still yet, an avatar may be tagged to indicate to what types of content the avatar may be exposed. Regions may specify that certain types of content exist within a region. If the region's content is on the acceptable content tag the avatar will be permitted to enter that region.

An avatar may also be tagged with employer identification. The tag may be the full name of the company or may be a shortened unique ID such as a stock symbol. Regions may be allowed for employees of specific companies and avatars. Employees, however, may be restricted from communicating certain content with specific employees such as employees of another company with whom the first company does not have an agreement on the exchange of the content.

In yet another embodiment, an avatar may be tagged with a list of avatars or employees of companies for which confidential information may be shared. If an employee attempts to transfer information that is tagged confidential to an avatar not belonging in the list of acceptable confidants then the information transfer is not permitted.

With respect to ratings, several methods for region rating are possible within the scope of this invention. Three potential methods are described: self-rating, vu-rating, and dynamic rating. For self-rating, regions may rate the content within the region. Ratings may be age limiting, content descriptions, or standardized rating system.

Operators of a virtual universe may rate the regions within that universe. Furthermore, virtual universes may separate the universe into sections associated with each ranking. Ratings may be age limiting, content descriptions, or standardized rating system.

Still yet, a virtual universe may use known art to dynamically establish a rating for the region. Such technology could be applied to detect specific content within a virtual universe and extended to infer a rating for the region.

Regardless, one or more of the above-described databases may be used to store avatar tags and region ratings. Furthermore, the database(s) may be used to store a rule table derived from avatar tags which indicate the regions, content, and communications permitted for the avatar. This database may be consulted by regions, avatars, and the virtual universe to determine if a specific action should be permitted.

C. Additional Features

Under the present invention, the following additional features can be provided:

(1) Filtration based on location in the VU, avatar language in region, objects and region communications.

(2) A tag on an avatar indicates that he or she should not be approached with respect to inappropriate content. This tag may be self-placed or placed by an employer.

(3) A tag on an employee avatar indicates that he or she should not be approached with respect to proprietary material pertaining to other companies. This tag may be self-placed or placed by an employer.

(4) A "shield" can be provided around objectionable content can also accomplish 1, 2, or 3.

The shield may restrict another avatar from coming within a certain distance of the shielded object or an avatar within the shield. Such a distance shielding may be accomplished by setting a threshold distance D1 associated with an object or a first avatar, checking a second avatar's distance D2 away from the first avatar or object, and determining if $D2<D1$. If $D2<D1$, then the second avatar is restricted from taking action that would further decrease D2.

(5) A transparency or blackout of inappropriate avatars can also accomplish 1, 2, or 3.

(6) Levels of permitted exposure to sensitive materials can be established.

(7) Employees of a company B are permitted or not permitted to attend meetings hosted by company A.

Moreover, additional or similar protective actions for restricted access among members of companies or denied parties may include: warning messages, restrictions in teleportations and other movements such as flying and walking into certain regions belonging to Company A for which access is restricted, i.e., access is only for employees of Company A—and the exchange of inventory items that are typically contained within inventories associated with avatars, and restrictions in document exchanges. These additional features can be provided by any one of the processing modules discussed above, or by additional processing module(s).

III. Computerized Implementation

Figure 6:
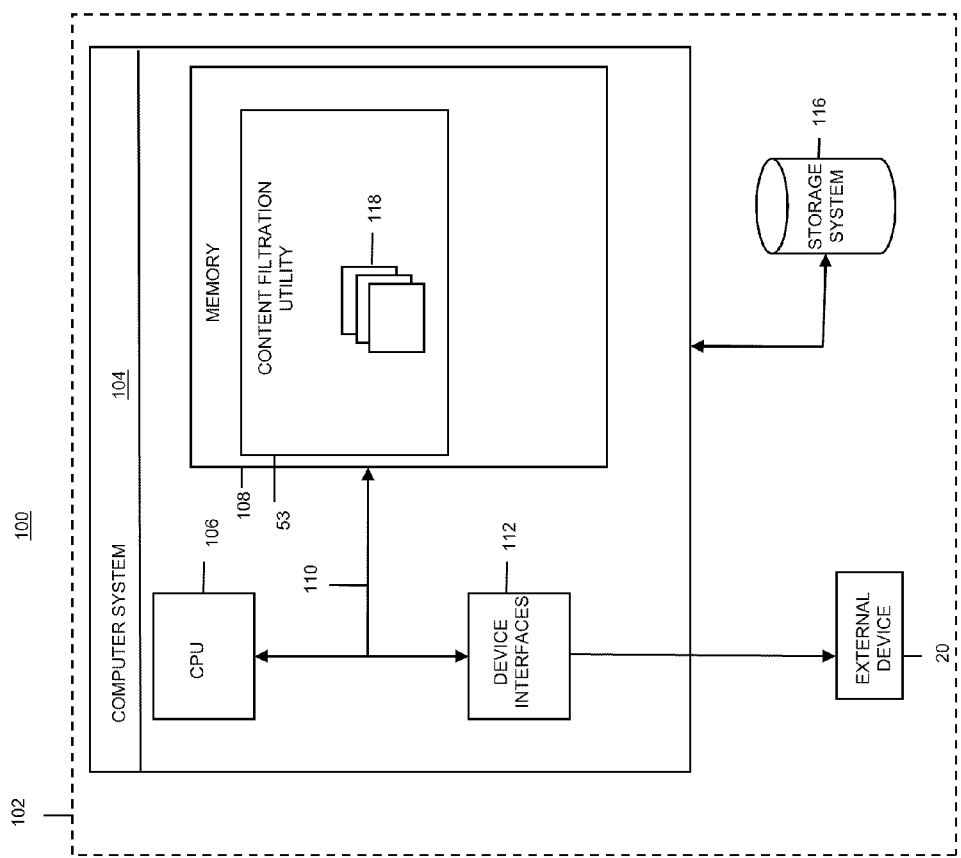
FIG. 6 shows computerized implementation according to one embodiment of the present invention.

Referring now to FIG. 6, a computerized implementation 100 of the present invention is shown. As depicted, implementation 100 includes computer system 104 deployed within a computer infrastructure 102. This is intended to demonstrate, among other things, that the present invention could be implemented within a network environment (e.g., the Internet, a wide area network (WAN), a local area network (LAN), a virtual private network (VPN), etc.), or on a standalone computer apparatus system. In the case of the former, communication throughout the network can occur via any combination of various types of communications links.

For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer apparatus infrastructure 102 is intended to demonstrate that some or all of the components of implementation 100 could be deployed, managed, serviced, etc., by a service provider who offers to implement, deploy, and/or perform the functions of the present invention for others.

As shown, computer system 104 includes a processing unit 106, a memory 108, a bus 110, and device interfaces 112. Further, content filtration utility 53 is shown having external devices and storage system 116 that communicate with bus via device interfaces (although image capture device 20 alternatively could directly communicate with bus 110). In general, processing unit 106 executes computer program code, such as content filtration utility 53, which is stored in memory 108 and/or storage system 116. While executing computer program code, processing unit 106 can read and/or write data to/from memory 108, storage system 116, and/or device interfaces 112. Bus 110 provides a communication link between each of the components in content filtration utility 53.

Computer infrastructure 102 is only illustrative of various types of computer infrastructures for implementing the invention. For example, in one embodiment, computer infrastructure 102 comprises two or more computing devices (e.g., a server cluster) that communicate over a network to perform the various process of the invention. Moreover, computer system 104 is only representative of various possible computer systems that can include numerous combinations of hardware. To this extent, in other embodiments, content filtration utility 53 can comprise any specific purpose computing medium comprising hardware and/or computer program code for performing specific functions, any computing medium that comprises a combination of specific purpose and general purpose hardware/software, or the like.

In each case, the program code and hardware can be created using standard programming and engineering techniques, respectively. Moreover, processing unit 106 may comprise a single processing unit, or be distributed across one or more processing units in one or more locations, e.g., on a client and server. Similarly, memory 108 and/or storage system 116 can comprise any combination of various types of data storage and/or transmission media that reside at one or more physical locations. Further, device interfaces 112 can comprise any processing module for exchanging information with one or more external devices. Still further, it is understood that one or more additional components (e.g., system software, math co-processing unit, etc.) not shown in FIG. 6 can be included in content filtration utility 53.

Storage system 116 can be any type of system (e.g., the databases discussed above) capable of providing storage for information under the present invention such as item appearances. To this extent, storage system 116 could include one or more storage devices, such as a magnetic disk drive or an optical disk drive. In another embodiment, storage system 116 includes data distributed across, for example, a local area network (LAN), wide area network (WAN) or a storage area network (SAN) (not shown). In addition, although not shown, additional components, such as cache memory, communication systems, system software, etc., may be incorporated into content filtration utility 53.

Figure 7:
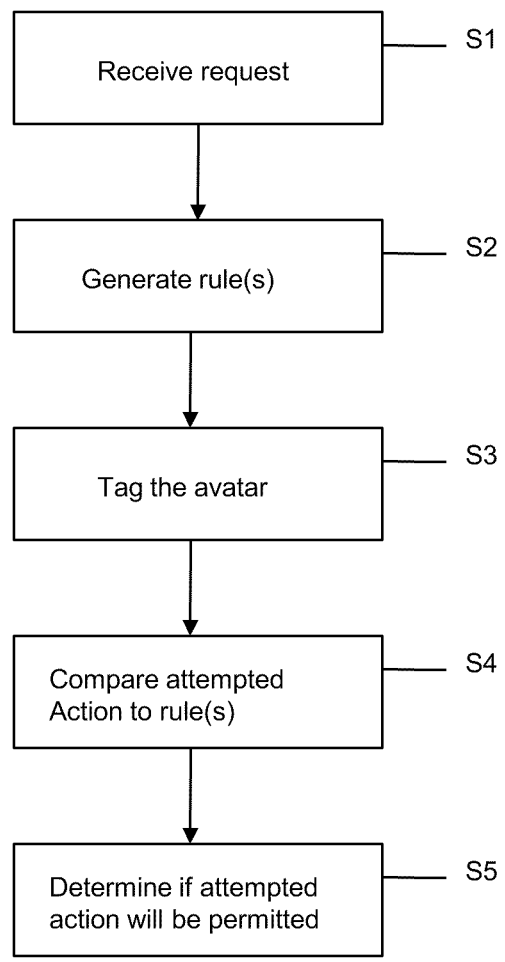
FIG. 7 shows a flow diagram of a method according to one embodiment of the invention.

Shown in memory 108 of content filtration utility 53 is content filtration utility 53, with a set of processing modules 118. The processing modules 118 correspond to those shown in FIG. 5 for content filtration utility 53. They have been shown in group format 118 in FIG. 6 to demonstrate that the configuration of FIG. 5 need not be limiting and the same functionality could be accomplished in any quantity and/or configuration of processing modules. Still yet, set of processing modules 118 provides the functions of the present invention as described herein. Such functionality will be illustrated using method flow diagram of FIG. 7. FIG. 7 shows the method by which an action will be allowed following a request for content or a request to travel to a region.

As shown, in step S1, a request for content exposure restrictions for an avatar in the VU will be received. In step S2, a set of rules that reflect the content exposure restrictions will be generated. In step S3, the avatar will be tagged with at least one tag. In step S4, an action attempted by the avatar will be compared to the set of rules. In step S5, it will be determined whether the action will be allowed based on the set of rules and the at least one tag. Thus, the action will be allowed based upon the determination.

While shown and described herein as a solution for filtering content in a VU, it is understood that the invention further provides various alternative embodiments. For example, in one embodiment, the invention provides a computer-readable/useable medium that includes computer program code to enable a computer infrastructure to provide content filtration in a VU. To this extent, the computer-readable/useable medium includes program code that implements each of the various process of the invention. It is understood that the terms computer-readable medium or computer useable medium comprises one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 108 (FIG. 6) and/or storage system 116 (FIG. 6), e.g., a fixed disk, a read-only memory, a random access memory, a cache memory, etc.

In another embodiment, the invention provides a method that performs the process of the invention on a subscription, advertising, and/or fee basis. That is, a service provider, such as a Solution Integrator, could offer to provide content filtration in a VU. In this case, the service provider can create, maintain, and support, etc., a computer infrastructure, such as computer infrastructure 102 (FIG. 6) that performs the process of the invention for one or more customers. In return, the service provider can receive payment from the customer(s) under a subscription and/or fee agreement and/or the service provider can receive payment from the sale of advertising content to one or more third parties.

In still another embodiment, the invention provides a computer-implemented method for filtering content in a VU. In this case, a computer infrastructure, such as computer infrastructure 102 (FIG. 6), can be provided and one or more systems for performing the process of the invention can be obtained (e.g., created, purchased, used, modified, etc.) and deployed to the computer infrastructure. To this extent, the deployment of a system can comprise one or more of: (1) installing program code on a computing device, such as content filtration utility 53 (FIG. 6), from a computer-readable medium; (2) adding one or more computing devices to the computer infrastructure; and (3) incorporating and/or modifying one or more existing systems of the computer infrastructure to enable the computer infrastructure to perform the process of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic device system/driver for a particular computing and/or device, and the like.

A data processing system suitable for storing and/or executing a program code can be provided hereunder and can include at least one processor communicatively coupled, directly or indirectly, to memory element(s) through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output or device devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method for filtering content in a virtual universe (VU) by a computer apparatus, comprising:

receiving a request, by said computer apparatus, for content exposure restrictions for an avatar in the VU, the content exposure restrictions being based on employment data associated with the avatar;

generating a set of rules, by said computer apparatus, that reflect the content exposure restrictions;

establishing, by said computer apparatus, a virtual shield around content according to the content exposure restrictions, the virtual shield restricting the avatar from approaching a distance, from the content, beyond a predetermined threshold;

tagging the avatar, by said computer apparatus, with at least one tag;

comparing, by said computer apparatus, an action attempted by the avatar to the set of rules;

determining, by said computer apparatus, whether the action will be allowed based on the set of rules and the at least one tag;

evaluating, by said computer apparatus, whether the action, if allowed, would bring the avatar to a distance, from the content, beyond the predetermined threshold; and preventing, by said computer apparatus, access by the avatar to the content when a result of the evaluation is that the action, if allowed, would bring the avatar to the distance beyond the predetermined threshold.

2. The method of claim 1, further comprising:
setting a rating, by said computer apparatus, for a region of the VU; and
preventing access, by said computer apparatus, to the region by the avatar if the rating exceeds a maximum allowable region rating established for the avatar.

3. The method of claim 2, further comprising:
setting a rating, by said computer apparatus, for content in the VU; and
preventing access, by said computer apparatus, to the content by the avatar if the rating exceeds a maximum allowable content rating established for the avatar.

4. The method of claim 3, further comprising: establishing, by said computer apparatus, a virtual shield around content that the avatar is prevented from accessing.

5. The method of claim 1, the at least one tag being selected from a group consisting of: an age, a content type, and a maximum allowable rating.

6. The method of claim 1, further comprising: storing, by said computer apparatus, the set of rules and the at least one tag in a database.

7. A system for filtering content in a virtual universe (VU), comprising:
a processor;
a request processing module for receiving a request for content exposure restrictions for an avatar in the VU, the content exposure restrictions being based on employment data associated with the avatar;
a rules processing module for generating a set of rules that reflect the content exposure restrictions;
a shield processing module for establishing a virtual shield around content according to the content exposure restrictions, the virtual shield restricting the avatar from approaching a distance, from the content, beyond a predetermined threshold;
a tagging processing module for tagging the avatar with at least one tag;
a comparison processing module for comparing an action attempted by the avatar to the set of rules;
a decision processing module for: determining whether the action will be allowed based on the set of rules and the at least one tag, and evaluating whether the action, if allowed, would bring the avatar to a distance, from the content, beyond the predetermined threshold; and
a content access processing module for preventing access by the avatar to the content when a result of the evaluation is that the action, if allowed, would bring the avatar to the distance beyond the predetermined threshold,
wherein said modules are components of said system.

8. The system of claim 7, further comprising:
a rating processing module for setting a rating for a region of the VU; and
a region access processing module for preventing access to the region by the avatar if the rating exceeds a maximum allowable region rating established for the avatar.

9. The system of claim 7, further comprising:
a content processing module for setting a rating for content in the VU; and wherein the content access processing module is further configured for preventing access to the content by the avatar if the rating exceeds a maximum allowable content rating established for the avatar.

10. The system of claim 9, wherein the shield processing module is further configured for establishing a virtual shield around content that the avatar is prevented from accessing.

11. The system of claim 7, the at least one tag being selected from a group consisting of: an age, a content type, and a maximum allowable rating.

12. The system of claim 11, further comprising a storing processing module for storing the set of rules and the at least one tag in a database.

13. A computer readable storage device containing a program product for filtering content in a virtual universe (VU), the computer readable storage device comprising program code for causing a computer apparatus to perform the steps of:
receive a request for content exposure restrictions for an avatar in the VU, the content exposure restrictions being based on employment data associated with the avatar;
generate a set of rules that reflect the content exposure restrictions;
establish a virtual shield around content according to the content exposure restrictions, the virtual shield restricting the avatar from approaching a distance, from the content, beyond a predetermined threshold;
tag the avatar with at least one tag;
compare an action attempted by the avatar to the set of rules;
determine whether the action will be allowed based on the set of rules and the at least one tag;
evaluate whether the action, if allowed, would bring the avatar to a distance, from the content, beyond the predetermined threshold; and
prevent access by the avatar to the content when a result of the evaluation is that the action, if allowed, would bring the avatar to the distance beyond the predetermined threshold;
wherein said steps are executed by said computer apparatus.

14. The computer readable storage device containing the program product of claim 13, the computer readable storage device further comprising program code for causing the computer to perform the steps of:
set a rating for a region of the VU; and
prevent access to the region by the avatar if the rating exceeds a maximum allowable region rating established for the avatar.

15. The computer readable storage device containing the program product of claim 14, the computer readable storage device further comprising program code for causing the computer to perform the steps of:
set a rating for content in the VU; and
prevent access to the content by the avatar if the rating exceeds a maximum allowable content rating established for the avatar.

16. The computer readable storage device containing the program product of claim 15, the computer readable storage device further comprising program code for causing the computer apparatus to establish a virtual shield around content that the avatar is prevented for accessing.

17. The computer readable storage device containing the program product of claim 13, the at least one tag being selected from a group consisting of: an age, a content type, and a maximum allowable rating.

18. The computer readable storage device containing the program product of claim 13, the computer readable storage device further comprising program code for causing the computer apparatus to store the set of rules and the at least one tag in a database.

19. A method for deploying a system for filtering content in a virtual universe (VU), comprising:
  providing a computer apparatus infrastructure to:
    receive a request for content exposure restrictions for an avatar in the VU, the content exposure restrictions being based on employment data associated with the avatar;
    generate a set of rules that reflect the content exposure restrictions;
    establish a virtual shield around content according to the content exposure restrictions, the virtual shield restricting the avatar from approaching a distance, from the content, beyond a predetermined threshold;
    tag the avatar with at least one tag;
    compare an action attempted by the avatar to the set of rules; and
    determine whether the action will be allowed based on the set of rules and the at least one tag;
    evaluate whether the action, if allowed, would bring the avatar to a distance, from the content, beyond the predetermined threshold; and
    prevent access by the avatar to the content when a result of the evaluation is that the action, if allowed, would bring the avatar to the distance beyond the predetermined threshold
    wherein said steps are executed by said computer apparatus infrastructure.

20. The method of claim 19, the at least one tag being selected from a group consisting of: an age, a content type, and a maximum allowable rating.

* * * * *